United States Patent
Matsuo et al.

[19]

[11] Patent Number: 6,091,873
[45] Date of Patent: Jul. 18, 2000

[54] DISPERSION SHIFTED OPTICAL FIBER

[75] Inventors: Shoichiro Matsuo; Masahiro Horikoshi, both of Sakura, Japan

[73] Assignee: Fujikura Ltd., Tokyo, Japan

[21] Appl. No.: 09/169,654

[22] Filed: Oct. 9, 1998

[30] Foreign Application Priority Data

Oct. 14, 1997 [JP] Japan .................................. 9-280915

[51] Int. Cl.$^7$ .................................................. G02B 6/02
[52] U.S. Cl. .................... 385/123; 385/124; 385/126; 385/127
[58] Field of Search .................................. 385/122, 123, 385/124, 125, 126, 127, 128

[56] References Cited

U.S. PATENT DOCUMENTS

| | | | |
|---|---|---|---|
| 5,963,700 | 10/1999 | Kato et al. ................................ | 385/127 |
| 5,995,695 | 11/1999 | Aikawa et al. ........................... | 385/123 |

FOREIGN PATENT DOCUMENTS

| | | | |
|---|---|---|---|
| 0 689 068 A1 | of 0000 | European Pat. Off. ................ | 385/123 |
| 0 774 676 A2 | of 0000 | European Pat. Off. ................ | 385/123 |
| 0 789 255 A1 | of 0000 | European Pat. Off. ................ | 385/123 |
| 10-62640 | of 0000 | Japan . | |
| 8-220362 | of 0000 | Japan . | |

OTHER PUBLICATIONS

WO 97/33188, International Publication Date: Sep. 12, 1997.

XP 000646740, Single–Mode Dispersion–Shifted Fibers With Effective Area Larger Than 80 um$^2$ and Good Bending Performance.

XP–000749816, Dispersion Shifted Optical Fiber for Wavelength–Division–Multiplexing Transmission.

N. Yamada et al., "Dispersion Shifted Fibers With Low Nonlinear Sensitivity", Technical Digest CLEO/Pacific Rim '95, pp. 44, Jul. 10, 1995.

S. Matsuo, et al., "Dispersion Shifted Fibers for WDM Transmission", Technical Report of IEICE CS97–43, OCS97–23 (1997–06), pp. 37–42, Jun. 24, 1997.

S. Matsuo, et al., "Dispersion Shifted Fibers With Low Nonlinear Sensitivity", Technical Report of IEICE vol. 96, No. 217 EMD96–39–52, pp. 55–59, Aug. 1, 1996.

*Primary Examiner*—Phan T. H. Palmer
*Attorney, Agent, or Firm*—Pearne & Gordon LLP

[57] ABSTRACT

A dispersion-shifted optical fiber (DS-fiber) is structured so that it has nearly zero chromatic dispersion in the 1.55 μm wavelength band and, at the same time, achieves both reduced non linear effects and low dispersion slope. In particular, dispersion slope is reduced to a level sufficient for the fiber to be used for wavelength division multiplexing (WDM) applications. The properties of the fiber are developed such that chromatic dispersion in the 1.55 μm band is nearly zero but not zero, effective cross section area is 45~70 μm$^2$, bending loss is 0.1~100 dB/m, dispersion slope is 0.05~0.08 ps/km/nm$^2$, and the cutoff wavelength is such that transmission is always single-mode transmission within the 1.55 μm band. Such a DS-fiber has sufficiently large effective cross section area Aeff, low bending loss and small dispersion slope to make the fiber suitable for use in WDM transmission systems.

4 Claims, 1 Drawing Sheet

DISPERSION SHIFTED OPTICAL FIBER

BACKGROUND OF THE INVENTION

1. Field of the Invention

The present invention relates in general to dispersion-shifted optical fiber of nearly zero chromatic dispersion within a 1.55 μm wavelength band, while achieving reduced non linear effects and low bending loss, and relates in particular to an optical fiber whose dispersion slope is reduced sufficiently.

The present invention is based on a Patent Application No. Hei9-280915, filed in Japan, the content of which is incorporated herein by reference.

2. Description of the Related Art

Dispersion-shifted optical fiber (referred to as DS-fiber hereinbelow) is an optical fiber whose chromatic dispersion value is almost zero in a 1.55 μm wavelength band where the transmission loss is minimal for quartz group optical fiber. For example, a DS-fiber having a staircase type refractive index distribution (refractive index profile) is well known.

The DS-fiber having such a refractive index profile is characterized by having smaller bending loss compared with other types of DS-fiber, such as step-profile type or triangular-profile type fibers, and somewhat larger mode filed diameter (hereinbelow referred to as MFD); however, relative to the normal single-mode fiber for 1.3 μm band, the MFD is relatively small at about 8 μm or less.

When MFD is small, transmission problems are encountered because not only splice losses are increased but, for applications requiring high power density within the fiber such as optical amplifier applications for example, non linear effects become high and transmission characteristics become seriously degraded.

A quantitative measure of non linear effects is $n_2/\text{Aeff}$ where $n_2$ is a non linear refractive index for the fiber, and Aeff is the effective cross section area of the fiber. Because $n_2$ is approximately constant for a given optical material, Aeff must be made large to decrease non linear effects in the fiber.

On the other hand, Aeff and MFD in DS-fibers are related by the following expression:

$$\text{Aeff} = k \cdot \pi/4 \cdot (\text{MFD})^2$$

where k is a correction factor.

Here, when the core diameter changed in DS-fibers, there are not less than two radius values for zero chromatic dispersion in the 1.55 wavelength band.

Of these solution values, the smallest value is referred to as the small-diameter solution, and the next smallest value is referred to as the large-diameter solution. Generally, a DS-fiber having staircase type refractive index profile adopts the large-diameter solution.

It has been reported that the correction factor k for a DS-fiber having the normal staircase-type refractive index profile with a large-diameter solution is about 0.944 and remains unchanged regardless of processing parameters used on the fiber.

Therefore, to increase the Aeff, it is necessary to increase MFD.

However, the normal DS-fiber having the staircase type refractive index profile based on the large-diameter solution has a constant MFD value of approximately 8 μm, and therefore, it can not increase the Aeff and enable reduction in non linear effects.

To resolve such problem, the present inventors have proposed a DS-fiber having small-diameter solution in a Japanese Patent Application, First Publication No. Hei8-220362 (Application date Heisei 7, February 10).

In this invention, a small-diameter solution is adopted for DS-filter having a staircase type refractive index profile, thereby increasing the correction factor to about 0.95~0.96, and MFD to about 7.8~8.6 μm. The result is that Aeff is increased and non linear effects have been reduced.

However, in this invention, although an advantage is gained that Aeff is increased by adopting the small-diameter solution, there remained a difficulty that bending loss and dispersion slope are increased.

Furthermore, for wavelength division multiplexing (WDM) transmission systems, which have been under active development in recent years, even greater reduction in non linear effects is demanded. However, it is difficult for DS-fiber with staircase type refractive index profile to meet such a challenge, because of its limited ability to increase Aeff.

The present inventors have submitted a Japanese Patent Application, Fist Publication, No. Hei10-62640 (application date Heisei 8, August 15), and disclosed a DS-fiber with emphasis on increasing the Aeff.

The DS-fiber disclosed in JPA, First Publication No. Hei10-62640 has a ring-structured refractive index profile, and is comprised by a center core section having a high refractive index, and a ring core section provided separately from the center core section having a low refractive index, cladding provided on the outer periphery of the ring core section, and an intermediate layer disposed between the center core section and the ring core section.

As disclosed in JPA, First Publication, No. Hei8-220362, in DS-fibers having the staircase refractive index profile, it was known that Aeff can be increased by adopting the small-diameter solution. Therefore, in this invention, the small-diameter solution is adopted with a primary objective of increasing Aeff.

The ring-structured DS-fiber (presented in JPA, First Publication No. Hei10-62640) shows almost zero chromatic dispersion in the 1.55 μm band, and its Aeff is higher than that of DS-fiber having the staircase type refractive index profile, thereby resulting in decreased non linear effects as well as low bending loss. Therefore, this type of DS-fiber met two of the important requirements.

However, such a DS-fiber still left a problem that the dispersion slope increases because of the increase in Aeff. High dispersion slope is not desirable in wavelength multiplexing transmission systems because it causes inconsistencies in the transmission of the plural wavelengths.

Accordingly, although increasing in Aeff has been a priority topic, in the past, to reduce non linear effects in DS-fiber for use in wavelength multiplexing system, in recent years, there have been a DS-fiber with achieving sufficient reduction in dispersion slope, rather than with increasing Aeff, to meet the needs of recent system.

Therefore, one of the topics of study in the present invention is to develop a DS-fiber, whose Aeff would be high enough for use in wavelength division multiplexing system to decrease non linear effects, with high priority placed on decreasing its dispersion slope.

SUMMARY OF THE INVENTION

It is a distinguishing feature of the present invention to provide a DS-fiber based on large-diameter solution.

In the DS-fiber having the ring-structured refractive index profile, presented in the previous invention, small-diameter solution was used because the emphasis was primarily to increase the Aeff. For this reason, it was not possible to reduce its dispersion slope sufficiently.

In the study that led to the present invention, the emphasis was placed on reducing the dispersion slope, and it was discovered that, by using the large-diameter solution to design a DS-fiber, its dispersion slope can be made sufficiently small while increasing its Aeff more than that in a DS-fiber having the staircase refractive index profile, so that the resulting DS-fiber can be used in wavelength multiplexing transmission system, by having both low non linear effects and small bending loss.

DESCRIPTION OF THE INVENTION

Figure 1:
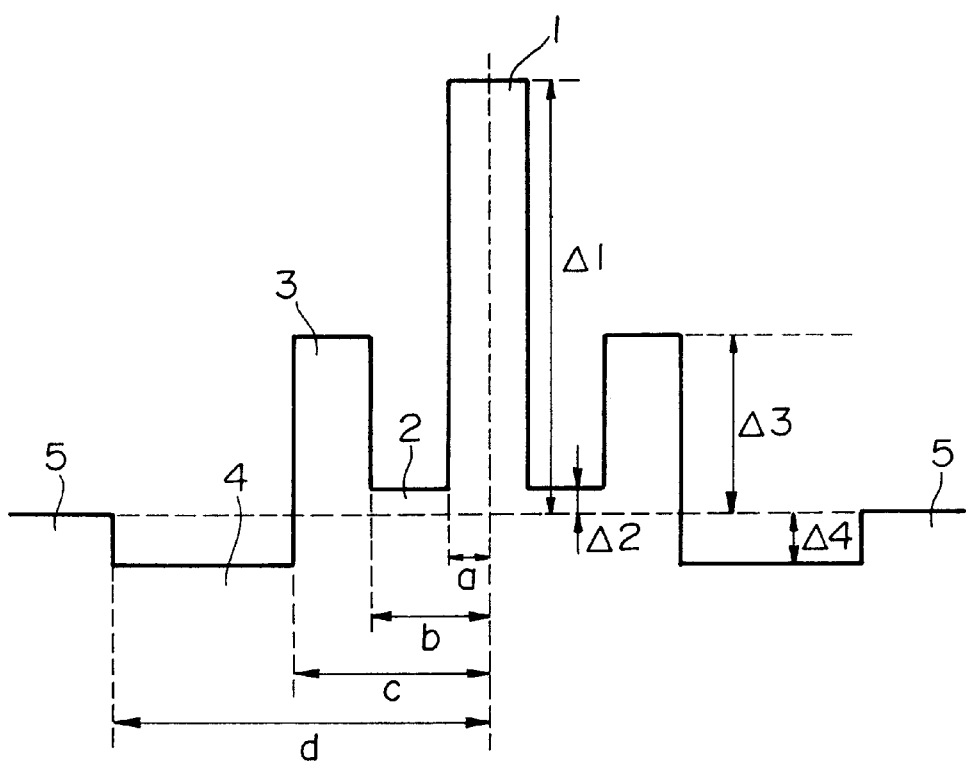
FIG. 1 is a drawing showing an example of the refractive index profile of the DS-fiber of the present invention.

The DS-fiber of the present invention exhibits the following characteristics. The chromatic dispersion in the 1.55 μm wavelength band is nearly zero but not zero, the effective cross section area is 45~70 μm$^2$, bending loss is 0.1~100 dB/m, the dispersion slope is 0.05~0.08 ps/km/nm$^2$. It has a cutoff wavelength which answers for a single mode propagation in the 1.55 μm band.

In the present invention, the operational band of 1.55 μm wavelength (the 1.55 μm wavelength band) means a range of wavelengths between 1520 to 1580 nm.

Also, chromatic dispersion nearly zero means that, within the operational band, chromatic dispersion value is in a range between −5~+5 ps/nm/.km. However, it is necessary that chromatic dispersion value does not actually become 0 ps/nm.km. This is because, if chromatic dispersion value is 0 ps/nm.km, non linear effects such as four-optical-mixing become undesirable large.

Also, the effective cross section area Aeff is defined by the following relation.

$$A\mathit{eff} = \frac{2\pi\left\{\int_0^\infty r|E(r)|^2 dr\right\}^2}{\int_0^\infty r|E(r)|^4 dr}$$

where r is a radius of the fiber, E(r) is the electric field strength at radius r.

Bending loss is a value measured with a wavelength of 1.55 μm in a fiber bent at a bend radius (2R) of 20 mm. Cutoff wavelength is a value measured according to a method of Japanese Industrial Standards (JIS) or CCITT 2m protocol or a value measured in actual use.

Also, dispersion slope relates to wavelength-dependence of chromatic dispersion, and is obtained as a slope of a curve in a graph of wavelength (nm) on x-axis and chromatic dispersion (ps/nm.km) on a y-axis.

The primary feature of DS-fiber of the present invention is that dispersion slope is in a range 0.05~0.08 ps/km/nm$^2$ and is made small enough.

At the same time, the effective cross section area Aeff is 45~70 μm$^2$, which is large compared with the staircase type refractive index profile, and is able to suppress non linear effects to a level sufficient for use in the WDM transmission systems.

In other words, an optical fiber having the properties described above will be a DS-fiber with sufficiently reduced non linear effects so as to be applicable to WDM transmission systems, and have small bending loss and low dispersion slope.

If Aeff is less than 45 μm$^2$, suppression of non linear effects is insufficient. If it is in excess of 70 μm$^2$, the large-diameter solution does not exist in low bending loss region so that it is difficult to satisfy the needs for the dispersion slope.

Also, bending loss in excess of 100 dB/m is not desirable, because the transmission loss becomes high even with a slight curvature in the fiber.

Also, because the large-diameter solution is adopted, it is possible to realize a sufficiently small range, 0.05~0.08 ps/km/nm$^2$, of dispersion slope. This range is chosen, because it is difficult to produce dispersion slope of less than 0.05 ps/km/nm$^2$, and if the dispersion slope exceeds 0.08 ps/km/nm$^2$, such a DS-fiber does not satisfy the needs of reduced dispersion slope as defined in the present invention.

Further, DS-fiber is usually a single-mode fiber, and must always provide single-mode transmission within the operational band. To do this, the cutoff wavelength must be a value to guarantee single-mode transmission.

For the present DS-fiber to possess the properties described above, the first necessary condition is that the fiber must have a ring-structured refractive index profile such as the one shown in FIG. 1.

FIG. 1 shows a concentric structure of DS-fiber comprised by a center core section 1, a first ring section 2 surrounding the center core section 1, a second ring section 3 surrounding the first ring section 2, and a third ring section 4 surrounding the second ring section 3, followed by a cladding surrounding the third ring section 4. The core section 1, first ring section 2, second ring section 3 and the third ring section 4 are arranged in the state of a concentric circle.

Refractive indexes $n_0$, $n_1$, $n_2$, and $n_3$, for the core section 1, first ring section 2, second ring section 3 and the third ring section 4, respectively, are related as follows: $n_0 > n_2$, $n_2 > n_1$, $n_2 > n_3$, $n_3 \leq n_4$.

As will be described later, cladding 5 is made of either pure silica or F-doped silica, therefore, $n_4$ is not limited to the refractive index of pure silica.

In the refractive index profile shown in FIG. 1, based on a reference of zero refractive index for cladding 5, the relative refractive index differences designated as follows: Δ1 for the difference between cladding 5 and center core section 1; Δ2 between cladding 5 and first ring section 2; Δ3 between cladding 5 and second ring section 3; and Δ4 between cladding 5 and third ring section 4. The actual values are in the following ranges: +0.5~+0.8% for Δ1; −0.1~−0.1% for Δ2; +0.05~+0.5% for Δ3; and −0.2~+0.0% for Δ4.

However, a problem with such a DS-fiber is that, with increasing Aeff, there is a tendency for increase in the cutoff wavelength. Therefore, it is desirable to shift the cutoff wavelength to a lower value by selecting a low value for Δ4 such as the range described above.

Therefore, a second necessary condition for the DS-fiber is to adopt the large-diameter solution for the core diameter.

To accomplish this requirement, referring to FIG. 1, the outer diameters of center core section 1, first ring section 2, second ring section 3 and third ring section 4, respectively, designated as 2a, 2b, 2c, 2d, should be chosen such that b/a is not less than 1.5, and preferably between 1.5~4.0.

Also, the actual values for "1" is 2.0~4.0 μm, and "b-a" is 1.0~5.0 μm, "c-b" is 1.0~12 μm; and "d-c" is 0.0~20 μm.

When b/a is less than 1.5, it is not possible to increase Aeff sufficiently, on the other hand, it is not desirable to exceed 4.0, because of the difficulty in controlling the properties of manufactured fiber.

When a is less than 2.0 μm or exceeds 4 μm, no large-diameter solution exist to satisfy the properties of the DS-fiber of the present invention.

When b-a is less than 1.0 μm, there is not benefit of providing the first ring section 2, and if it exceeds 5.0 μm, the fiber may suffer from problems of manufacture as well as some properties such as cutoff wavelength and bending loss.

When c-b is less than 1.0 μm, there is no benefit of providing the second ring section 3, and if it exceeds 12 μm, the fiber may suffer from problems of manufacture as well as some properties such as increase in the cutoff wavelength.

When d-c is 0.0 μm, the fiber is not provided with a third ring section 4. Even in this case, by adjusting the values of b/a, a, b-a, c-b, same effects of the present invention can be obtained. When d-c exceeds 20 μm, the fiber may suffer from manufacturing problems.

Also, the outer diameter of normal optical fiber is made at about 125 μm, by selecting the values for a~d, the value of difference between cladding radius and d will become self-determining.

In overall summary, therefore, by selecting the values of the parameters (Δ1, Δ2, Δ3, Δ4, b/a, a, b-a, c-b, d-c) in the range described above, and by adopting the large-diameter solution, a DS-fiber having the present property values will be obtained.

Table 1 summarizes the properties of DS-fiber, exemplified by cutoff wavelength (λc), Aeff, bending loss (BL), Dispersion Slope (DS), and the various combinations of parameters to meet the first and second requirements.

TABLE I

| b/a | a (μm) | b-a (μm) | c-b (μm) | d-c (μm) | Δ1 (%) | Δ2 (%) | Δ3 (%) | Δ4 (%) |
|---|---|---|---|---|---|---|---|---|
| 1.50 | 2.34 | 1.17 | 10.52 | 4.67 | 0.700 | 0.000 | 0.070 | 0.000 |
| 2.50 | 2.47 | 3.71 | 2.72 | 3.46 | 0.600 | 0.000 | 0.180 | -0.030 |
| 2.50 | 2.50 | 3.74 | 5.24 | 1.00 | 0.570 | 0.000 | 0.171 | 0.000 |
| 2.60 | 2.59 | 4.14 | 2.85 | 3.36 | 0.550 | 0.000 | 0.220 | -0.028 |
| 2.70 | 2.67 | 4.54 | 2.94 | 3.20 | 0.510 | 0.000 | 0.220 | 0.000 |
| 2.8 | 2.40 | 4.31 | 1.20 | 2.64 | 0.60 | 0.00 | 0.30 | -0.03 |
| 2.8 | 2.43 | 4.38 | 2.68 | 2.68 | 0.60 | 0.02 | 0.18 | -0.03 |
| 3.0 | 2.31 | 4.63 | 4.63 | 3.70 | 0.60 | 0.00 | 0.05 | -0.03 |
| 2.5 | 2.65 | 3.98 | 5.30 | 2.92 | 0.55 | 0.00 | 0.14 | -0.03 |

Table 1 continued

| b/a | λc (μm) | Aeff (μm²) | BL (dB/m) | Disp. Slope (ps/km/nm²) |
|---|---|---|---|---|
| 1.50 | 1.41 | 42 | 0.581 | 0.0558 |
| 2.50 | 1.28 | 52 | 9.33 | 0.0656 |
| 2.50 | 1.32 | 56 | 24.6 | 0.0671 |
| 2.60 | 1.53 | 60 | 26.1 | 0.0697 |
| 2.70 | 1.66 | 68 | 85.8 | 0.0720 |
| 2.8 | 1.118 | 50.44 | 15 | 0.0644 |
| 2.8 | 1.343 | 52.01 | 9.7 | 0.0629 |
| 3.0 | 0.939 | 47.77 | 29.9 | 0.0563 |
| 2.5 | 1.649 | 56.35 | 25 | 0.0536 |

As can be understood from Table 1, by combining parameters from a wide range of values, it is possible to obtain DS-fiber having the targeted characteristics.

From such a viewpoint, present invention characterizes a DS-fiber in terms of the properties of the DS-fiber, because it is difficult to define the invention in terms of the structural parameters.

It is clear that such properties have not been attainable in conventional DS-fibers.

The DS-fiber in the prevent invention is based on adopting the large-diameter solution from the two core sizes available for zero chromatic dispersion in the 1.55 mm band, thereby attaining a low bending loss as well as a relatively high Aeff, and enabling to lower its dispersion slope to not more than 0.08 ps/km/nm².

The present DS-fiber can be produced by normal fiber manufacturing method such as vapor-phase axial deposition (VAD) method, so that, in the present case, the center core section 1 and the second ring section 3 were made from Ge-doped silica or pure silica, and the first ring section 2, third ring section 4 and cladding 5 were made from pure silica or F-doped silica.

In a fiber having the profile shown in FIG. 1, the distribution of electric field strength produced by propagating light is shaped in such a way to leave a long tail in the cladding 5 because of the presence of the second ring section 3, therefore, it is preferable that, when manufacturing mother material for the optical fiber, fair section of soot for cladding should be made at the same time as the sot for the center core.

Determination of the refractive index profile by a method such as Refracted Near-Field Profiling (RNFP) method on the DS-fiber fibers produced in this study showed that corners were found to be rounded and smooth shaped, compared with the schematic profile shown in FIG. 1.

The values should be chosen such that peak values are selected for parameters such as Δ1, Δ2, Δ3, Δ4 and half value full width half peak value should be selected for a~d.

Typical properties of the test fiber produced in this study are summarized in Table 2, which shows that the produced fiber meets the properties required in the present invention.

TABLE 2

| Measured Items | Results |
|---|---|
| Aeff at 1550 nm (μm²) | 53.5 |
| MFD at 1550 nm (μm) | 8.51 |
| λc for 2 m fiber (μm) | 1.7 |
| Bending Loss at 1550 nm, 20 Φ (dB/m) | 1.20 |
| Zero-dispersion wavelength (μm) | 1574.00 |
| Dispersion Value at 1550 nm (ps/km/nm) | -1.32 |
| Dispersion Slope at 1550 nm (ps/km/nm²) | 0.053 |
| Transmission Loss at 1550 nm (dB/km) | 0.208 |
| Polarization dispersion (ps/vkm) | 0.123 |

What is claimed is:

1. A dispersion-shifted optical fiber having characterizing properties of: substantially zero-dispersion but not zero-dispersion in a wavelength band of 1.55 μm, an effective cross section area in a range of 45~70 μm², a bending loss in a range of 0.1~100 dB/m, and a dispersion slope in a range of 0.05~0.08 ps/km/nm², and producing a cutoff wavelength within a 1.55 mm wavelength band so as to always provide single-mode transmission.

2. A dispersion-shifted optical fiber according to claim 1 comprised by: a center core section, a first ring section surrounding said center core section, a second ring section surrounding said first ring section; a third ring section surrounding said second ring section; and a cladding surrounding said third ring section, wherein a refractive index $n_0$, $n_1$, $n_2$, $n_3$ and $n_4$ for said center core section, said first ring section, said second ring section, said third ring section and said cladding, respectively, are related in a refractive index profile according to the following relationships; $n_0 > n_2$, $n_2 > n_1$, $n_2 > n_3$, and $n_3 \leq n_4$.

3. A dispersion-shifted optical fiber according to claim 2, wherein diameters 2a, 2b, 2c and 2d, respectively for said center core section, said first ring section, said second ring section, and said third ring section are related according to the following relationships; $b/a \leq 1.5$, wherein a is in a range 2.0~4.0 μm, b-a is in a range 1.0~5.0 μm, c-b is in a range 1.0~12 μm, and d-c is in a range 0.0~20 μm.

4. A dispersion-shifted optical fiber according to claim 2, wherein, when the refractive index of the said cladding is a reference of zero, $\Delta 1$ is the refractive index difference between said cladding and said center core section, $\Delta 2$ is the refractive index difference between said cladding and said first ring section, $\Delta 3$ is the refractive index difference between said cladding and said second ring section, and $\Delta 4$ is the refractive index difference between said cladding and said third ring section, then $\Delta 1$ is $+0.5 \sim 0.8\%$; $\Delta 2$ is $-0.1 \sim 0.1\%$; $\Delta 3$ is $+0.05 \sim +0.5\%$; and $\Delta 4$ is $-0.2 \sim +0.0\%$.

* * * * *

UNITED STATES PATENT AND TRADEMARK OFFICE
CERTIFICATE OF CORRECTION

PATENT NO. : 6,091,873
DATED : JULY 18, 2000
INVENTOR(S) : Matsuo et al.

It is certified that error appears in the above-indentified patent and that said Letters Patent is hereby corrected as shown below:

```
Column 1, line 25, delete "filed" and insert
    --field--.

Column 2, line 4, delete "filter" and insert
    --fiber--.

Column 2, line 5, delete "0.96" and insert
    --0.97--.

Column 3, line 29, delete "ps/nm/.km" and
    insert --ps/nm.km--.

Column 4, line 45, delete "-0.1~0.1%" and
    insert -- -0.1~+0.1%".

Column 4, line 59, delete " "1" " and
    insert -- "a" --.
```

UNITED STATES PATENT AND TRADEMARK OFFICE
CERTIFICATE OF CORRECTION

PATENT NO. : 6,091,873
DATED : July 18, 2000
INVENTOR(S) : Matsuo et al.

It is certified that error appears in the above-indentified patent and that said Letters Patent is hereby corrected as shown below:

```
Column 5, line 1, delete "not" and insert
    --no--.

Column 6, line 14, delete "sot" and insert
    --soot--.

Column 8, line 2, delete "+0.5~0.8%;" and insert
    --+0.5~+0.8%;--.

Column 8, line 3, delete "-0.1~0.1%," and insert
    -- -0.1~+0.1%;--.
```

Signed and Sealed this

Seventeenth Day of April, 2001

Attest:

NICHOLAS P. GODICI

*Attesting Officer*   Acting Director of the United States Patent and Trademark Office